Jan. 31, 1933.  F. X. LAUTERBUR ET AL  1,895,634
DOUGH MOLDING MACHINE
Filed Feb. 12, 1931   2 Sheets-Sheet 1

Jan. 31, 1933.  F. X. LAUTERBUR ET AL  1,895,634
DOUGH MOLDING MACHINE
Filed Feb. 12, 1931   2 Sheets-Sheet 2

INVENTOR.
Frank X. Lauterbur
Edward J. Lauterbur
BY
ATTORNEY.

Patented Jan. 31, 1933

1,895,634

UNITED STATES PATENT OFFICE

FRANK X. LAUTERBUR AND EDWARD J. LAUTERBUR, OF SIDNEY, OHIO

DOUGH MOLDING MACHINE

Application filed February 12, 1931. Serial No. 515,272.

Our invention relates to dough molding or loaf forming machines, in which dough is rolled into cylindrical shapes or modifications of cylindrical shapes well known in the art which is exemplified in the prior patents granted Jan. 4, 1916, #1,167,187, Jan. 18, 1921, #1,366,266, Oct. 24, 1922, #1,432,874, May 5, 1925, #1,536,224 and May 5, 1925, #1,537,018, to which the present invention is applicable.

The object of the present invention is to afford a more extended period of treatment of the dough or loaf by virtue of a greater length of travel through the apparatus without unduly increasing the size, and, especially, the length of the apparatus.

A further object is to conveniently control the length of travel and period of treatment.

A further object is to initially feed the loaf forming flattened strip of dough in a manner better to facilitate the coiling of this strip into the rudimentary cylindrical form which is to be perfected during the subsequent travel and treatment.

A further object is to provide for a desirably large number of different kneading effects by a conveniently operated means.

To the accomplishment of the said above and related ends, said invention, then consists in the contsruction and novel combination of parts hereinafter fully described, illustrated in the accompanying drawings, and particularly pointed out in the claims hereto appended; it being understood that various changes in the form, proportion, size and minor details of construction, within the scope of the claims, may be resorted to without departing from the spirit or sacrificing any of the advantages of the invention.

Referring to the drawings:

Figure 1a is a detail perspective of a pressure member mounting.

Figure 1:
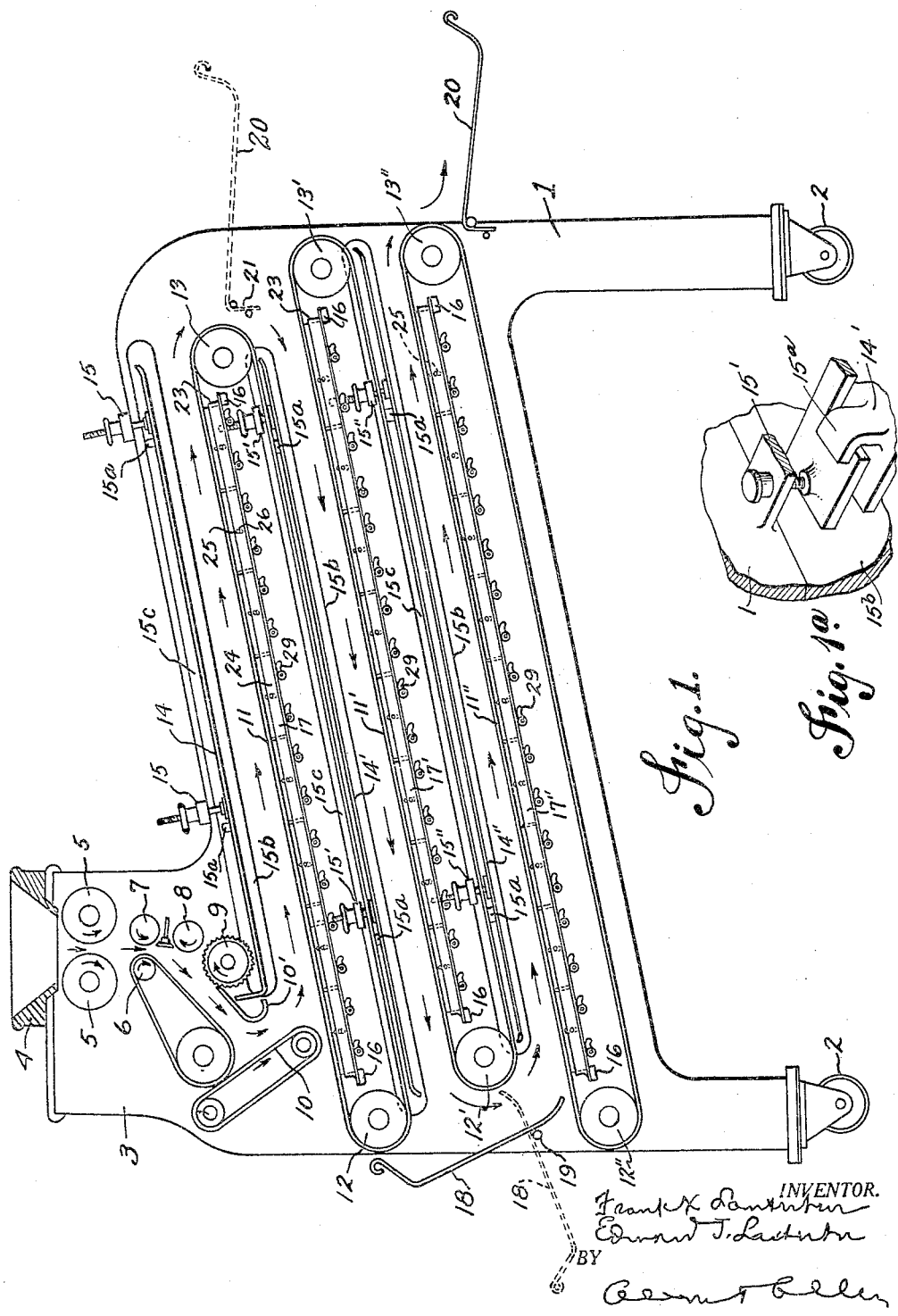
Figure 1 is a side elevation of a dough molding machine constructed in accordance with this invention with the hopper shown in section and one side being omitted to show the interior details.

In the accompanying drawings in which is illustrated the preferred embodiment of the invention, the frame 1 mounted on rollers 2, on which it may be moved about, has at the top of one end, which as shown is at the left, an upward extension 3 supporting on its top the hopper 4 from which the dough passes between the rolls 5 and between the belt 6 and rolls 7, 8 and 9 so arranged that the travel is out toward the adjacent end of the machine, which travel however, is modified by a belt 10, at the left of the belt 6 and traveling downwardly and inwardly of the machine, forming a downwardly moving wall for the outlet of the material-flattening and curling device made up of these rolls and belts, so that this delivery outlet curves to the right in the direction of travel of the uppermost endless flexible conveyor belt 11 which passes around rolls 12 and 13 near respective opposite ends of the frame 1. Above this belt is the pressure member or board 14 mounted for up and down adjustment on cross pieces 15 at the top of the frame 1.

Below and set somewhat to the right of the conveyor belt 11 is a second conveyor belt 11' passing around rollers 12' and 13' with its right end in receiving relation to the upper conveyor, and having the pressure member or board 14' adjustably mounted on cross pieces 15' in the frame 1; above this second belt 11'. Below this second conveyor belt 11' is the third conveyor belt 11" on rolls 12" and 13" with its left end in receiving relation to the second conveyor, and having the pressure member or board 14" mounted on cross pieces 15" in the frame 1. That is to say, these devices are staggered in a descending series; and as the uppermost device conveys to the right, the second to the left, and the third or lowermost to the right, the alternate conveyors, thus running in opposite directions, afford a relatively greater length of travel for the dough or loaf. All of these conveyors preferably incline upward from the left or feeding end of the machine, substantially parallel with each other.

Each pressure member 14, 14' or 14" is connected to its respective cross pieces 15, 15' or 15" by hooks 15a, so that it can be removed from the machine through a respective slot 15b in the side of the frame 1, each slot with a closure 15c. The pressure members thus may be removed for cleaning, or access may be had to them through the slots for this purpose, without removal.

Supported on projections 16 of the frame 1, along the lower sides of the upper stretches of the conveyor belts 11, 11' and 11" are the respective kneading boards 17, 17' and 17", the detailed novel construction of which will be described later.

The left end of the pressure board 14 projects under the roll 9, which is corrugated and turns oppositely to the travel of the material to initiate the curling of the material; and just to the left of this corrugated roll 9 is a plate 10' slanting down to the left and curving in toward the adjacent end of the pressure board 14, affording a smooth rounded surface as the inner wall of the curved delivery outlet, the outer wall of which is formed by the belt 10 as before described.

It will be understood that at the side of the frame the various rolls described are suitably operatively connected together so as to cause the rolls to rotate in the appropriate directions.

At the left end of the machine a pan-like member 18 is mounted on a pivot 19 just above the lowermost conveyor and is of such size and shape that when tilted up as shown by the solid lines, it encloses the spaces at the left ends of the conveyors and guides the dough or loaf down and around from the second conveyor on to the third or bottom conveyor; but if tilted down as shown by the dotted lines, its lower end swings up close to the left end of the second conveyor so that this member 18 forms a receptacle for the dough or loaf coming from the second or middle conveyor; thus reducing the length of travel of the dough or loaf.

Hung on the right end of the frame 1 is a similar member 20, in receiving relation to the end of the lowermost conveyor; which member 20 may be removed and hung on the elements 21 in receiving relation to the first or uppermost conveyor. By the use of these two members 18 and 20, shifting them to appropriate positions, the dough or loaf may be caused to travel the length of only one conveyor, or of two conveyors or of three conveyors. This enables the length of the period of treatment, both as concerns kneading the dough and the formation of it into the desired loaf, to be varied in accordance with the condition and consistency of the particular dough being operated upon.

It will be understood that the connections of the pressure members or boards 14' and 14" to their supports 15' and 15" respectively are at the sides of the under-running stretches of the respective conveyor belts 14' and 14".

Figure 2:
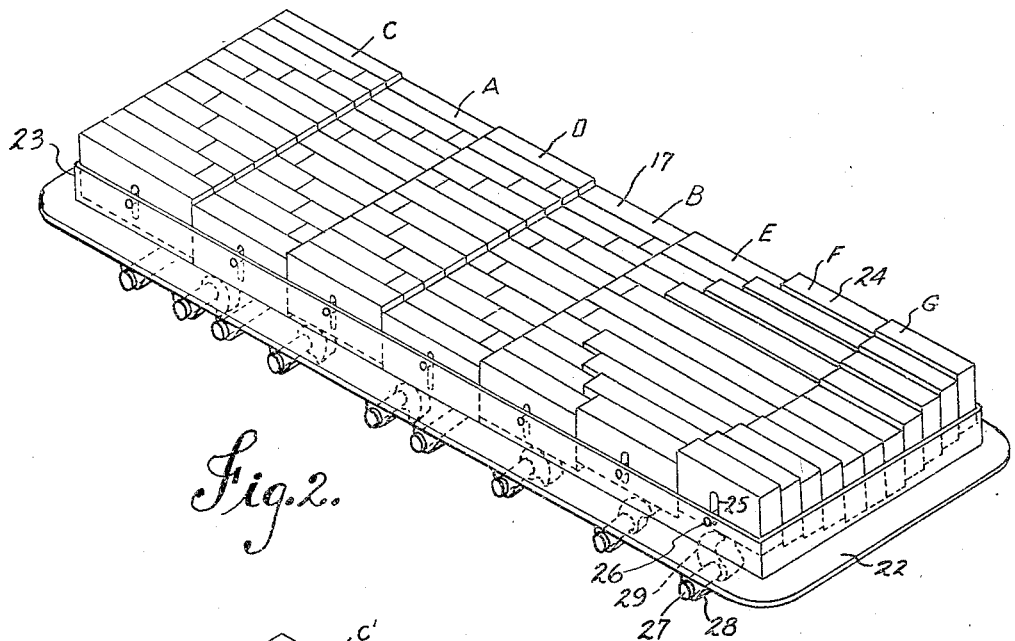
Figure 2 is a perspective view of one of the kneading boards.

The kneading board 17 of the uppermost conveyor is shown in detail in Figure 2; and it will be understood that the kneading boards of the other conveyors are of the same construction, as indicated on a small scale in Figure 1. In the example here shown, the kneading board comprises a base or support 22 having on its top, an upstanding curb 23 forming a rectangular enclosure, the bottom of which is open through the base 22. Set into this enclosure are a number of sections 24 all alike in being of rectangular block form, but being of various formations on their tops; either straight or stepped in various proportions. Each block has an upright slot 25 transversely through it, and the sections or blocks are arranged in series transversely of the structure, the series succeeding each other lengthwise longitudinally of the structure, with elements 26 projecting from the curbs 23 into the slots 25 of the sections, these elements 26 preferably being rods extending through these slots from one side curb to the other.

Figure 3:
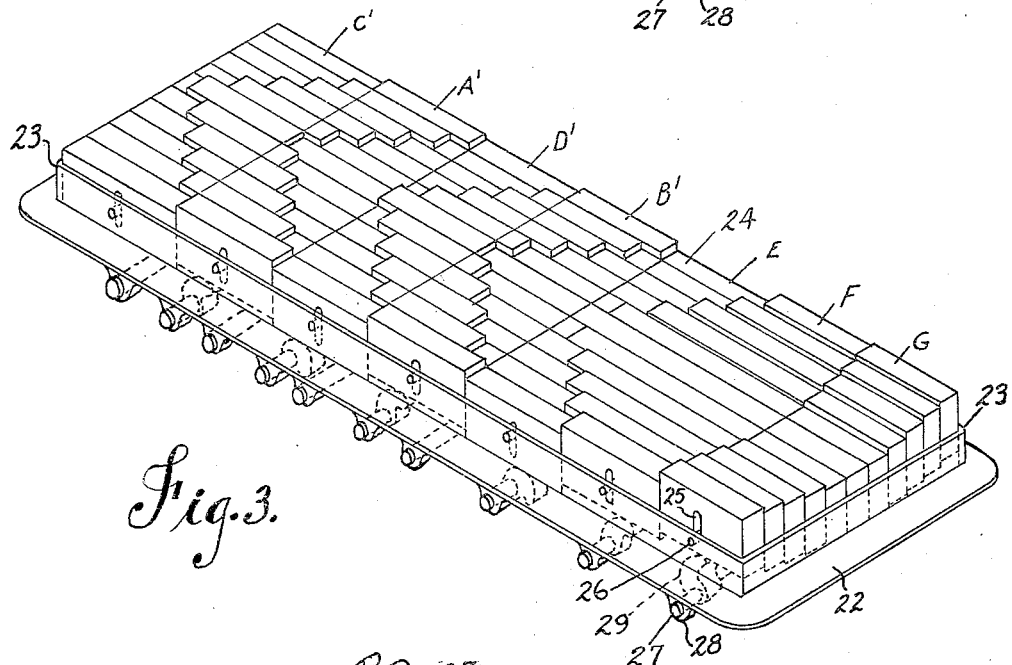
Figure 3 is a similar view of one of the kneading boards adjusted differently from that shown in Figure 2.
Figure 4:
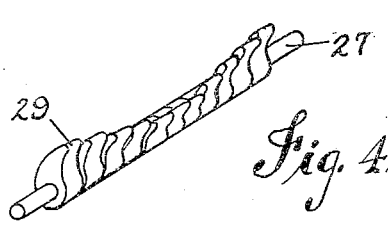
Figure 4 is a detailed perspective view of one of the kneading board adjusting shafts and the series of adjusting cams on the shaft.

Extending across under the base 22 lengthwise of the respective series of sections or blocks 24 are shafts 27 journalled in bearings 28 at the edges of the base 22. Cams 29 are fixed upon these shafts and variously spaced around their respective shafts, each cams 29 bearing up against the bottom of a respective section or block 24 of the transverse series served by the shaft. Certain of the transverse series as at A and B in Figure 2, have two such shafts and sets of cams while others, as C, D, E, F and G have one shaft and set of cams each. The particular shapes of the blocks and their dimensions, and the number of shafts and cams serving them, need not be described in detail; it being sufficient to explain that by providing the blocks or sections of various heights and lengths and shapes on their tops and supporting these at various heights on the differently positioned cams 29, practically any desired shape may be imparted to the upper surface of the kneading board thus made up. The purpose is to provide a series of undulations in the top of this kneading board so that as the flexible conveyor belt 11 drags thereover while pressing the dough or loaf against the pressure board 14, a kneading action results. At the left in Figure 2, the alternate series C, A, D and B provide simple straight undulations with plane tops. but at the right the undulations E, F and G are of progressively more trough-like formation. In Figure 3, the first four sections at the left, C', A', D' and B' as formed and adjusted, make undulations of a wide V-shape with the point of the V against the direction of travel of the belt 11, which will cause an up and down kneading of the dough or loaf and also a tendency to spread the material in both directions from the middle; and then the last three transverse series E, F and G, like those in Figure 2, have the progressively more trough-like formation. In either case this trough-like formation reduces the diameter of the end portions of the loaf which is being rolled and formed between the belt 11 and the board 14; for example, to the shape of Vienna bread. By turning the various cam shafts 27 to different angular positions, the blocks or sections 24 may be raised or lowered to afford various combinations and change the shapes of the undulations in accordance with the desired kneading effect or with the desired shape of the loaf. This greater variety of adjustments of kneading boards of the successive conveyors makes it possible to provide a number of different kneading effects or loaf forming effects, or both, at various stages of a relatively long path of travel of the material through the machine; permitting the operator to provide almost any shape or combination of shapes of the kneading board which may be found to be most suitable in practice with doughs of various kneading and forming properties.

Having thus described our invention, what we claim as new and desire to secure by Letters Patent, is:

1. In a machine of the character described, a descending series of devices each comprising a conveyor facing upward and a pressure member facing downward toward the conveyor, the conveyors having a staggered arrangement in the series and alternate ones of said conveyors running in opposite directions and the tops of said conveyors all being parallel, and means for feeding plastic material to the uppermost conveyor.

2. In a machine of the character described, a descending series of devices each comprising a conveyor facing upward and a pressure member facing downward toward the conveyor, the conveyors having a staggered arrangement in the series and alternate ones of said conveyors running in opposite directions, means for feeding plastic material to the uppermost conveyor, and means removably mounted in the machine for stopping passage of the material from any one of said devices to the device next succeeding in said series.

3. In a machine of the character described, a descending series of devices each comprising a conveyor facing upward and a pressure member facing downward toward the conveyor, the conveyors having a staggered arrangement in the series and alternate ones of said conveyors running in opposite directions, means for feeding plastic material to the uppermost conveyor, and a member in receiving relation to the delivery end of a preceding device in the series, shiftable either to act as a receptacle of material from said device, or to act as a closure and guide from said device to the receiving end of the next device in the series.

4. In a machine of the character described, in combination with a flexible conveyor and a pressure member facing each other, and means for feeding said conveyor, a kneading board structure having undulations supporting said conveyor, all of said undulations being changeable as to shape in transverse cross section.

5. In a machine of the character described, comprising a flexible conveyor, a kneading board structure having undulations supporting said conveyor, said undulations being made up of a plurality of individually and variously adjustable sections whereby the undulations are changeable as to shape.

6. In a machine of the character described, comprising a flexible conveyor, a kneading board structure having undulations supporting said conveyor, said undulations being made up of a plurality of longitudinally succeeding transverse series of individually and variously adjustable sections whereby the undulations are changeable as to shape.

7. In a machine of the character described, in combination with a flexible conveyor and a pressure member facing each other, and means for feeding said conveyor, a kneading board structure having sections supporting said conveyor, said sections being individually adjustable whereby said board is changeable as to shape and cam means operatable out of synchronism on said undulations to effect the individual adjustment and change of shape.

8. In a machine of the character described, in combination with a flexible conveyor and a pressure member facing each other, and means for feeding said conveyor, a kneading board structure having undulations supporting said conveyor, said undulations being made up of a plurality of adjustable sections whereby the undulations are changeable as to shape, and means for adjusting said sections comprising coaxial cams engaging respective sections and variously spaced around their axis.

9. In a machine of the character described, comprising a flexible conveyor, a kneading board structure having undulations supporting said conveyor, said undulations being made up of a plurality of adjustable sections whereby the undulations are changeable as to shape, and means for adjusting said sections comprising groups of cams, a group for each transverse series of sections, the cams of each group having a common axis along the transverse series of sections and engaging the respective sections of the series and being variously spaced around their axis.

10. In a machine of the character described, comprising a flexible conveyor, a kneading board structure having undulations supporting said conveyor, said undulations being made up of a plurality of adjustable sections whereby the undulations are changeable as to shape, a support for said sections comprising means guiding the sections and means for adjusting said sections comprising a shaft journalled on said support, and cams fixed on said shaft, engaging respective sections and variously spaced around said shaft.

11. In a machine of the character described, comprising a flexible conveyor, a kneading board structure having undulations supporting said conveyor, said undulations being made up of a plurality of longitudinally succeeding transverse series of adjustable sections whereby the undulations are changeable as to shape, a support for said sections comprising means guiding the sections, and adjusting devices for the respective series of sections each comprising a shaft journalled on said support along the series of sections, and cams on said shaft, variously spaced therearound and engaging the respective sections of the transverse series.

12. In a machine of the character described, comprising a flexible conveyor, a kneading board structure having undulations supporting said conveyor, said undulations being made up of a plurality of individually and variously adjustable sections whereby the undulations are changeable as to shape, a support comprising a guide for said sections, and means movable on said support for variously adjusting said sections.

13. In a machine of the character described, comprising a flexible conveyor, a kneading board structure having undulations supporting said conveyor, said undulations being made up of a plurality of transversely slotted adjustable sections whereby the undulations are changeable as to shape, a support comprising curbs at the sides of said sections, elements projecting from the curbs into the slots of the sections, and means movable on said support for variously adjusting said sections.

14. In a machine of the character described, a frame having side walls, a descending series of devices each comprising a conveyor facing upward and a pressure member facing downward toward the conveyor, the conveyors having a staggered arrangement in the series and alternate ones of said conveyors running in opposite directions, said walls having access openings at the sides of the respective pressure members, removable closures for the respective access openings, and supports on the walls above the respective access openings, on which said pressure members are removably mounted, for removal through the respective access openings.

15. In a machine of the character described, a frame having side walls, a descending series of devices each comprising a conveyor facing upward and a pressure member facing downward toward the conveyor, the conveyors having a staggered arrangement in the series and alternate ones of the conveyors running in opposite directions, said walls having access openings at the sides of the respective pressure members, removable closures for the respective openings, and supports mounted for up and down adjustment on the walls above the respective openings, on which supports said pressure members are removably mounted, for removal through the respective openings.

16. In a machine of the character described, a descending series of devices each comprising an endless flexible member and rotary members around which it runs at respective ends of the machine, with an upper stretch and an underrunning stretch, and a pressure member facing downward toward the upper stretch, said devices being staggered in the series whereby each upper stretch delivers to the upper stretch of the next lower device, alternate ones of said flexible members running in opposite directions, all of the stretches of said flexible members being parallel in their planes of travel and the pressure member of each device lower than a device in the series being close under the lower stretch of the device next above it.

FRANK X. LAUTERBUR.
EDWARD J. LAUTERBUR.